Jan. 27, 1959 H. S. JENCKS ET AL 2,871,457

MOUNTING FOR ELECTRONIC COMPONENTS

Filed Oct. 26, 1956 3 Sheets-Sheet 1

INVENTORS
HAROLD S. JENCKS AND
ROBERT TWOMEY

BY J. Edwin Coates
ATTORNEY

INVENTORS
HAROLD S. JENCKS AND
ROBERT TWOMEY
BY Edwin Coates
ATTORNEY.

MOUNTING FOR ELECTRONIC COMPONENTS

INVENTORS
HAROLD S. JENCKS AND
ROBERT C. TWOMEY
BY Edwin Coates
ATTORNEY

United States Patent Office 2,871,457
Patented Jan. 27, 1959

2,871,457

MOUNTING FOR ELECTRONIC COMPONENTS

Harold S. Jencks, Woodland Hills, and Robert C. Twomey, Los Angeles, Calif., assignors to Douglas Aircraft Company, Inc., Santa Monica, Calif.

Application October 26, 1956, Serial No. 618,633

10 Claims. (Cl. 339—75)

This application is a continuation-in-part of our co-pending application, Serial Number 473,424, filed December 6, 1954, now forfeited.

This invention relates to detachable electrical connectors and more particularly to an ejection mounting therefor suitable for use in conjunction with rack mounted electrical equipment.

It is the general practice that in complex installations, such as those encountered in the field of radio and radar, the various components are separately housed to enable the replacement and repair of any one without necessitating disassembly of the entire organization. The separate housing are supported by a common support or rack and each is provided with one part of a quick detachable electrical connector adapted to be engaged by a mating part fixed to the rack when the housing is thrust into supported position. The prime difficulty encountered with the units presently available is that, while the separate housings may be rapidly removed, the connector part fixed to the rack cannot be removed or reworked without requiring access to the rear of the rack. It is apparent that the inconvenience occasioned by such necessity goes far to defeat the very purpose for which the rack was intended.

It is another characteristic of the presently available apparatus that the removable housings have externally projecting handles or handgrips which can be grasped by an operator to remove the unit from the rack. While this feature is not entirely undesirable, in cramped quarters, as the interior of aircraft, space is at such a premium that even the usual handles must be eliminated if at all feasible.

By the construction employed in the present invention many of the inconveniences previously encountered have been overcome. By a novel connector support adapted to be attached to the equipment rack, a means is provided whereby the connector can be removed from the rack with the same degree of facility as experienced in the removal of the electrical component housing. Additionally, the features of the connector support also enable the elimination of the usual protruding handle on the housing.

According to the present invention the connector associated with the rack is affixed in position by a series of quick detachable fasteners and is removable from the rack through the same opening from which the electrical unit housing is removed. By the employment of this arrangement it is never required that an operator move the rack to enable access to the back panel thereof. The rack connector is further provided with a series of spring float mounts which coact in such a manner with the electrical housing that when the housing is released from the rack securing means it will be ejected automatically therefrom a distance sufficient to allow the operator or attendant to grasp its sides and effect complete separation. By this latter feature the usual handle or handgrip can be dispensed with to afford an important saving in space or clearance.

The floating mounting, by its flexibility, brings about still another feature especially desirable in production work. One of the prime drawbacks in any work is the limitation imposed by tolerances. In the presently used equipment of this general nature it will be readily appreciated that the laterally rigid mounting of all parts dictates that the maximum tolerance buildup not exceed five to ten hundredths inch. A variance in excess of this range either prevents the coupling of the connector parts or results in damage to the individual contacts by the bending imparted. The lateral flexibility above mentioned will, as is readily apparent, increase the maximum allowable tolerance accumulation to the range of twenty-five hundredths inch which is approximately three times that of the other organizations.

The foregoing advantages and others that will hereinafter become apparent are achieved by the exemplary construction below defined and shown in the accompanying drawings in which.

Figures 1, 4:
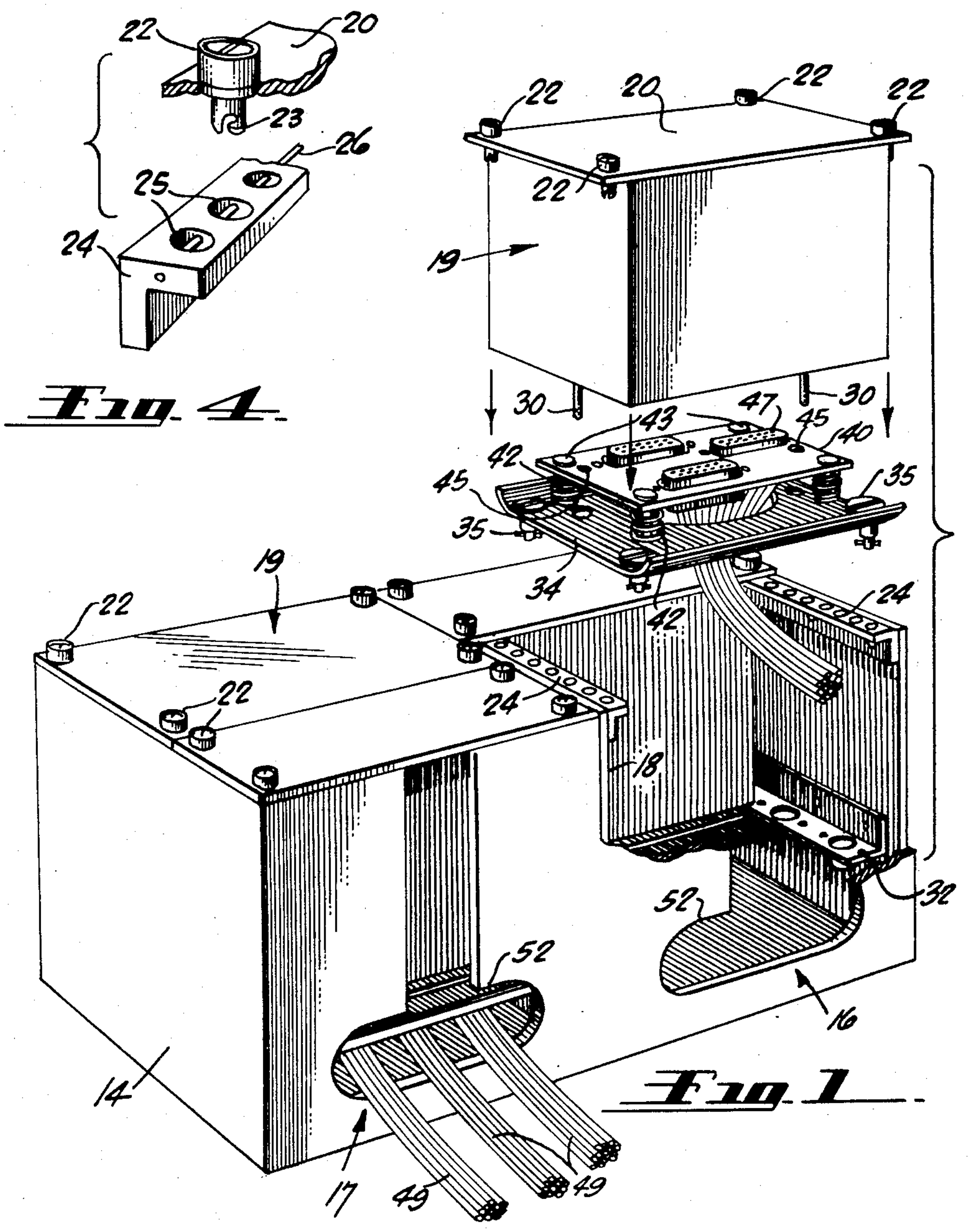
Figure 1 is a partially exploded perspective view, with some parts broken away, showing an electrical assembly incorporating the present invention.
Figure 4 is a fragmentary view, partially exploded, showing a fastening member used in maintaining some parts in assembled relation.
Figure 2:
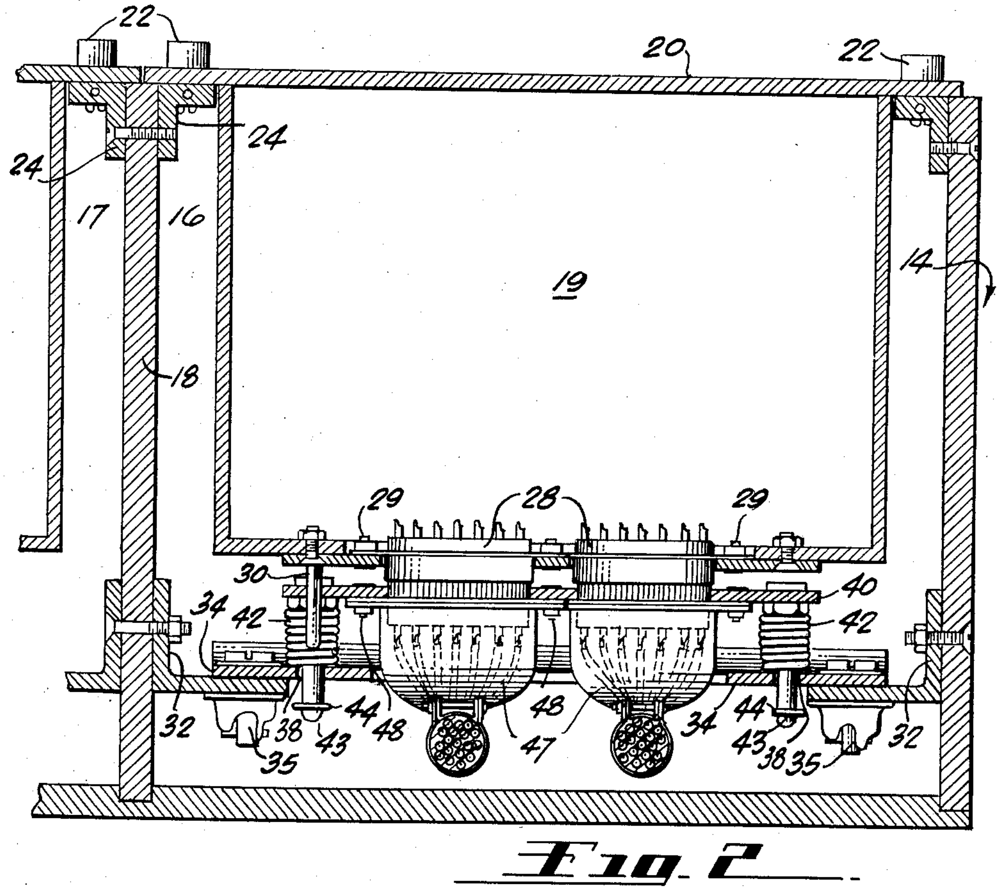
Figure 2 is a side elevational view in section of a portion of the assembly of Figure 1.
Figure 3:
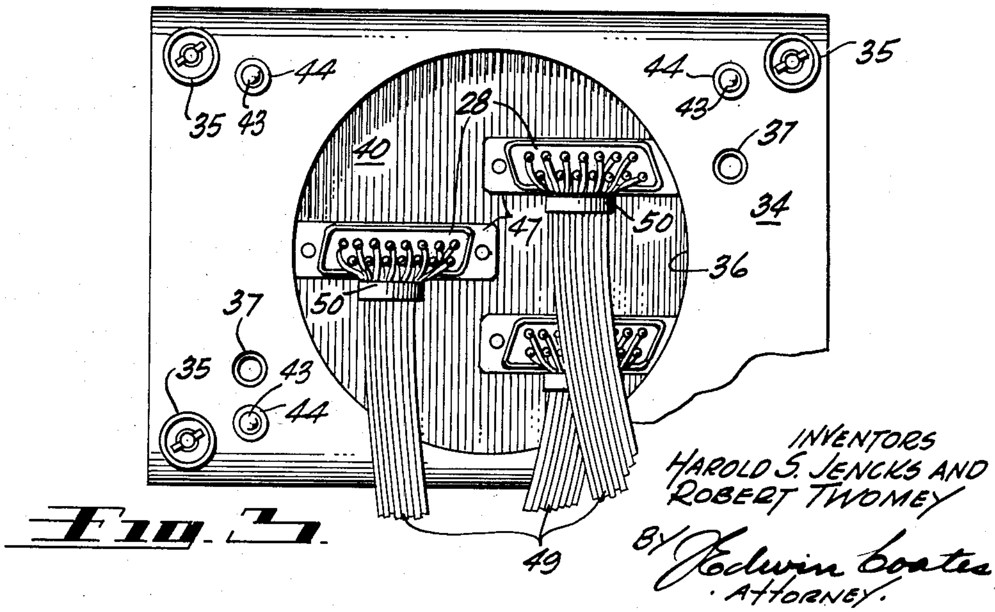
Figure 3 is a bottom plan view of a supporting plate with electrical connectors mounted thereon.

Referring now to the drawings, and in particular to Figures 1 and 2 thereof, an open top housing 14 is here shown as being divided into two compartments 16, 17 by a partition 18. This housing 14 is adapted to contain and releasably support therein a plurality of electrical units 19, such as radio or radar components, each having a face plate 20. In order that units 19 may be retained in their inserted position within housing 14 each face plate 20 has at the respective corners thereof a headed fastener 22 including an angularly slotted shank 23. As detailed in Figure 4, an angle strip 24, having multiple openings 25 through which a common locking rod or wire 26 passes diametrically, is affixed to the opposite sides of each compartment 16 and 17 in a position to receive and cooperate with the slotted shanks 23 of fasteners 22. Approximately one-quarter to one-half a turn of fastener 23 is required to fully engage or release it from engagement with lock wire 26.

Extending through the bottom of each unit 19 are several multi-prong electrical connectors 28 adapted to have their various contacts connected to appropriate points in the radio or radar components. The connectors 28 are flanged for reception of screws 29 by which they are maintained in position on the units 19. Guide pins 30 project outwardly from units 19 at points adjacent connectors 28 to assure alignment of the connectors 28 with their mating coupling parts hereinbelow described.

In each of compartments 16, 17 and spaced a short distance from the bottom thereof are a pair of parallel support angles 32, 32 respectively fixed to the partition 18 and to the side of housing 14 opposite therefrom. Upon these angles 32, 32 a first mounting plate 34 is removably maintained by suitable quick detachable fasteners 35. Plate 34 is provided with a main central aperture 36, a pair of diagonally disposed openings 37 and a set of symmetrically arranged openings 38. Floatingly attached to and spaced above plate 34 is a second mounting plate 40. This floating arrangement is here accomplished by means of compression springs 42 between the plates 34 and 40, the compression springs 42 encircling the shanks of pins 43. The motion of plate 40 away from plate 34 is limited by means of spring rings 44 seated within a groove in pins 43 and which abut the lower surface of plate 34. It is to be noted that the second or floating plate 40 has a pair of diagonally located openings 45 aligned with openings 37 in the first plate 34. These openings 37 and 45 are adapted to slidingly receive guide pins 30 which project from the bottom of unit 19.

For matingly receiving the prongs of connector parts 28, there are a like number of multi-prong receptacles 47 fastened in the central portion of the floating plate 40 by means of screw and nut units 48. The lower portions of receptacles 47 extend downwardly through the central aperture 36 and have their lead wires 49 held and directed away at right angles by strain relief clamps 50. Accommodating passage of the lead wires 49 out of housing 14 is a key slot 52 in the side of each compartment 16, 17.

The parts are so arranged and positioned that when plates 34 and 40 are supported on angles 32, the insertion of unit 19 into housing 14 first effects the coupling of plugs 28 and receptacles 47 and a simultaneous slight amount of compression in springs 42. Further motion of the unit 19 into housing 14 effects the full compression of springs 42. At the point of full compression, face plate 20 abuts upper angle members 24 at which time slotted fasteners 22 may be turned to lock the unit 14 in assembled position. To insure that the mating coupling parts 28, 47 are in full engaged position prior to full compression in the springs 42, the springs 42 are selected or designed to withstand approximately four to five times the frictional force required to be overcome to effect the coupling of the plugs 28 and receptacles 47.

It will be noted in Figure 1 that the connector parts 47 are asymmetrically arranged whereby there is only one relative position between housing 14 and unit 19 which will permit the coupling of the connectors. It will be apparent that this result could also be accomplished by an asymmetrical arrangement of guide pins 30.

In assembling the members of the present construction, plate 34 with its associated floating second plate 40 and receptacles 47 is introduced through the open side of housing 14 and is brought to rest on support angles 32. By the manipulation of fasteners 35 it is there firmly secured in place. It will be noted that by virtue of the presence of key slot 52 in the side of housing 14 there is no necessity to perform any undesirable bending of the leads 49 in the assembly procedure. With the parts thus assembled, unit 19 may be thrust into housing 14 to bring the connector parts 28 and 47 into engagement and to compress springs 42 in the manner and sequence above enumerated.

Upon release of fasteners 22 the expansion of springs 42 serves to eject the electrical unit 19 a slight distance out of housing 14. In practice this distance will be adequate to allow an operator to grasp the unit 19 by the edges of face plate 20. The unit may then be pulled from the housing 14 and simultaneously the separation of coupling parts 28, 47 is accomplished. The removal of plate 34 is accomplished by the reversal of the steps above set out in conjunction with its assembly.

It is to be understood that each of the units 19 is equipped with its own matching floating contacts and supporting adjuncts, and each of which is constructed in a like manner. Furthermore the number of rows and columns of units 19 within housing 14 may be varied to fit the requirements of any particular installation.

Figure 5:
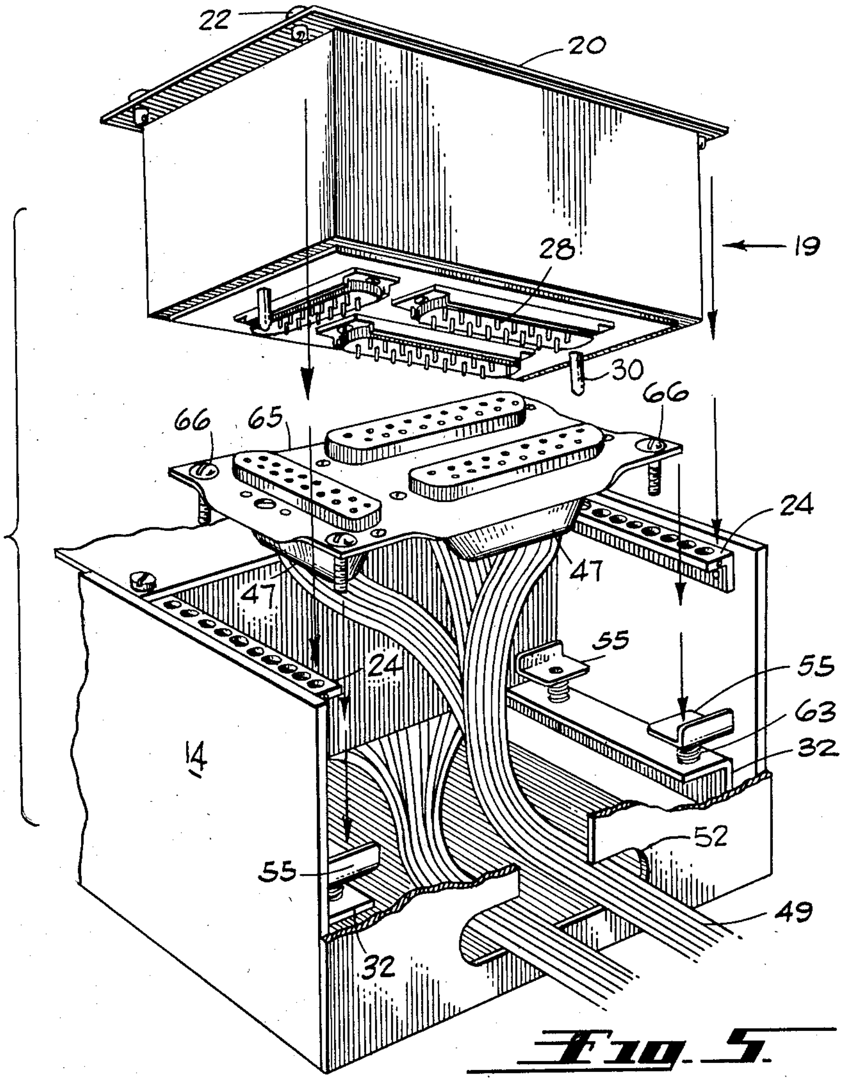
Figure 5 is a partially exploded view, with some parts broken away, showing a modified form of the invention.
Figure 6:
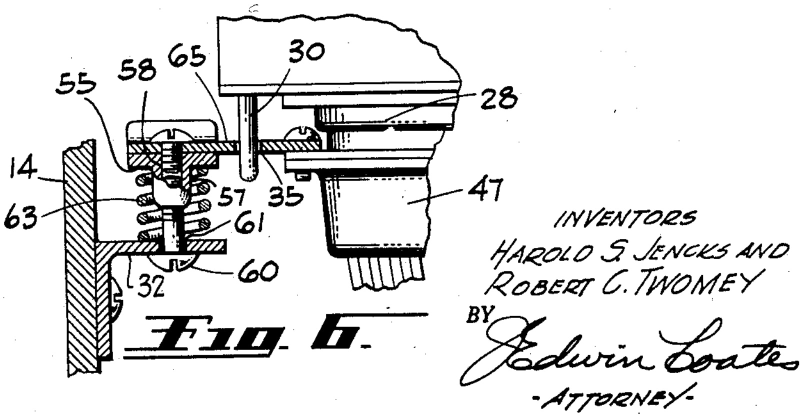
Figure 6 is a fragmentary side sectional view of a portion of the assembly of Figure 5.

In Figures 5 and 6 there is shown a second form of the invention wherein like numerals have been used to designate those parts whose construction and function are the same as corresponding parts in the showings of the first above described form. As will be understood, this second form of the invention shown in Figures 5 and 6 functions to produce the same advantages accomplished by the Figure 1 specie and differs therefrom essentially in the arrangement of the spring means for ejecting the electrical housing from its support rack.

On each of the support angles 32 in Figure 5 are attached a pair of feet or pads 55 spaced apart a distance approximately equal to the width of unit 19. As detailed in Figure 6, on the underside of each pad 55 there is a boss 57 with a screw threaded bore 58 therethrough. Screw 60 is inserted from the underside of angle 32 into threaded engagement with bore 58 and serves to limit the motion of pad 55 away from angle 32 under the force of compression spring 63. In lieu of the double mounting plates 34 and 40 employed in the Fig. 1 embodiment, there is here utilized a single coupling part support plate 65 adapted to have its corners releasably attached by screws 66 to, and supported by, the respective pads 55.

The mode of assembly of this second form is similar to that of the first and, briefly, is accomplished by inserting plate 65 and associated receptacles 47 through the open side of rack or housing 14 and simultaneously passing leads 47 through key-slot 52. When the plate 65 is seated on pads 55 screws 66 are made fast to anchor the parts in their associated positions. Electric unit 19 may then be thrust into the rack 14 to bring plugs 28 and sockets 47 into engagement and to compress eject spring 63. Quick fasteners 22 lock unit 19 in rack 14 and upon release of such fasteners 22 the springs 63 will expand or elongate to thrust unit 19 outwardly where it may be grasped and manually removed for replacement or repair.

While the invention is described with reference to two preferred embodiments herein shown, it is to be understood that it is susceptible to changes within the scope of the appended claims.

We claim:

1. A self ejecting electrical equipment rack assembly comprising: a hollow supporting framework having one side thereof open; a first mounting member insertable through the open side and attached to the framework remotely of the open side; a second mounting member attached to and movable relative to the said first mounting member; guide means restraining motion of the second mounting member; resilient means biasing the mounting members apart; one coupling part of a separable electrical connector affixed to the second mounting member; an equipment housing adapted to be thrust into the framework through the open side thereof; a second coupling part on the housing adapted to matingly engage the first said coupling part, the motion of the housing into the framework effecting connection of the coupling parts and also overcoming the force exerted by the resilient means; and means maintaining the housing within the framework against the force of the resilient means.

2. An electrical equipment rack assembly comprising: a main hollow framework having one side thereof open; brackets mounted on the interior of the framework; a first member removably attached to the brackets; a second member resiliently biased in spaced apart relation to the first member; means coacting between said members restraining relative lateral movement therebetween and limiting motion of the second member in the direction of bias; a first coupling part attached to the second member; an equipment housing movable into and out of the framework through the open side thereof; a second coupling part on the housing adapted to matingly engage the first coupling part along an axis parallel to the direction of bias on the said second member, the motion of the housing into the framework serving to effect engagement of the coupling parts and to overcome the bias on the second member; and means securing the housing within the framework, the bias on the second member serving to partially eject the housing from the framework when the securing means is released.

3. A self ejecting electrical equipment rack assembly comprising: a hollow supporting multi-compartmented framework having one side thereof open; a first mounting member insertable through the open side thereof of each compartment of the framework and attached to the housing remotely of the open side; a second mounting member attached to and movable relative to each said first mounting member; guide means restraining motion of each second mounting member; resilient means biasing each said first and second mounting members respectively apart; one coupling part of a separable electrical connector affixed to each second mounting member; an equipment housing adapted to be thrust into the framework compartment through the open side thereof; a second coupling part on the housing adapted to matingly engage the first said coupling part, the motion of the housing into the framework effecting connection of the coupling parts and also overcoming at least a portion of the force exerted by the resilient means; and means maintaining the housing within the framework against the force of the resilient means.

4. An electrical equipment rack assembly comprising: a hollow supporting framework including plural compartments having one side thereof open; first mounting members each insertable through the open side into one compartment and attached to the framework remotely of the open side; second mounting members each attached to and movable relative to each of the first said mounting members; guide means restraining motion of the second mounting members; resilient means biasing the first and second mounting members respectively apart; one coupling part of a separable electrical connector affixed to each of the second mounting members; equipment housing adapted to be thrust into the framework through the open side thereof; a second coupling part on the housing adapted to matingly engage the first said coupling part, the motion of the housing into the framework effecting connection of the coupling parts and also overcoming the force exerted by the resilient means; and means maintaining the housing within the framework against the force of the resilient means.

5. A self ejecting electrical equipment rack assembly comprising: a hollow supporting framework having one side thereof open; a first mounting member insertable through the open side and attached to the framework remotely of the open side; a second mounting member attached to and movable relative to the first said mounting member; means restraining lateral motion of the second mounting member; one coupling part of a separable electrical connector affixed to the second mounting member; an equipment housing adapted to be thrust into the framework through the open side thereof; a second coupling part on the housing adapted to matingly engage the first said coupling part, the motion of the housing into the framework effecting connection of the coupling parts; means maintaining the housing within the framework; and resilient means interposed between the mounting members to at least partially eject the housing when the maintaining means are released.

6. An electrical equipment rack assembly comprising; an open sided supporting framework; brackets interiorly attached to the framework; a first plate having an aperture therein removably secured to the brackets; a second plate mounted in spaced relation to the first plate; an electrical connector on the second plate, the aperture in the first plate accommodating lead wires to the connector; a housing insertable into the framework and having a connector thereon adapted to matingly engage the first said connector; means interacting between the plate members to eject the housing from the framework; and detachable fastening members maintaining the housing within the framework against the force tending to eject it therefrom.

7. A self ejecting electrical equipment rack assembly comprising: a hollow supporting framework having one side thereof open; a first member attached to the framework inwardly of the open side; a second member attached to and movable relative to the said first member; resilient means biasing the members apart; one coupling part of a separable electrical connector affixed to the second member; an equipment housing adapted to be thrust into the framework through the open side thereof; a second coupling part on the housing adapted to matingly engage the first said coupling part, the motion of the housing into the framework effecting connection of the coupling parts and also overcoming the force exerted by the resilient means; and means maintaining the housing within the framework against the force of the resilient means.

8. A self ejecting electrical equipment rack assembly comprising: a hollow supporting framework having one side thereof open; first support means attached to the framework remotely of the open side; second support means attached to and movable relative to the said first support means; means restraining motion of the second mounting member; resilient means biasing the first and second support means apart; one coupling part of a separable electrical connector affixed to the second support means; an equipment housing adapted to be thrust into the framework through the open side thereof; a second coupling part on the housing adapted to matingly engage the first said coupling part, the motion of the housing into the framework effecting connection of the coupling parts and also overcoming the force exerted by the resilient means; and means maintaining the housing within the framework against the force of the resilient means.

9. A self ejecting electrical equipment rack assembly comprising: a hollow supporting framework having one side thereof open; support brackets attached to the framework remotely of the open side; a transverse plate attached to and movable relative to the support brackets; biasing means interposed between the brackets and the plate normally urging them apart; one coupling part of a separable electrical connector affixed to the transverse plate; an equipment housing adapted to be thrust into the framework through the open side thereof; a second coupling part on the housing adapted to matingly engage the first said coupling part, the motion of the housing into the framework effecting connection of the coupling parts and also overcoming the force exerted by the biasing means; and means maintaining the housing within the framework against the force of the biasing means.

10. A self ejecting electrical equipment rack assembly comprising: a hollow supporting framework having one side thereof open; an electrical equipment housing adapted to be thrust into the framework through the open side thereof; an electrical connector on the housing; bracket means affixed to the framework; resiliently biased support means attached to the bracket means; a second electrical connector on the support means oriented for engagement with the first said connector, the initial motion of the housing into the framework effecting engagement of the connectors and partially overcoming the bias on the support means and the final motion of the housing into the framework further overcoming said bias; and means retaining the housing in the framework.

References Cited in the file of this patent

UNITED STATES PATENTS

| | | |
|---|---|---|
| 1,545,639 | Cohen | July 14, 1925 |
| 2,289,514 | Mastney et al. | July 14, 1942 |
| 2,602,842 | Morris et al. | July 8, 1952 |
| 2,729,800 | Knudsen | Jan. 3, 1956 |

FOREIGN PATENTS

| | | |
|---|---|---|
| 99,574 | Austria | Apr. 10 1925 |
| 621,595 | Great Britain | Apr. 12, 1949 |